(12) United States Patent
Koga

(10) Patent No.: US 12,021,184 B2
(45) Date of Patent: Jun. 25, 2024

(54) SOLID ELECTROLYTE AND BATTERY USING SAME

(71) Applicant: Panasonic Intellectual Property Management Co., Ltd., Osaka (JP)

(72) Inventor: Eiichi Koga, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 678 days.

(21) Appl. No.: 17/184,735

(22) Filed: Feb. 25, 2021

(65) Prior Publication Data

US 2021/0184253 A1    Jun. 17, 2021

Related U.S. Application Data

(63) Continuation of application No. PCT/JP2019/039466, filed on Oct. 7, 2019.

(30) Foreign Application Priority Data

Nov. 16, 2018  (JP) .................... 2018-215486

(51) Int. Cl.
*H01M 10/00* (2006.01)
*H01M 10/0525* (2010.01)
*H01M 10/0562* (2010.01)

(52) U.S. Cl.
CPC ... *H01M 10/0562* (2013.01); *H01M 10/0525* (2013.01); *H01M 2300/0068* (2013.01); *H01M 2300/0091* (2013.01)

(58) Field of Classification Search
CPC ..... H01M 10/0562; H01M 2300/0091; H01M 2300/0068
See application file for complete search history.

(56) References Cited

U.S. PATENT DOCUMENTS

| | | | |
|---|---|---|---|
| 10,116,001 B2* | 10/2018 | Chen ................ | H01M 10/0562 |
| 2012/0100433 A1 | 4/2012 | Suyama et al. | |
| 2015/0132662 A1 | 5/2015 | Zhang et al. | |
| 2016/0293946 A1 | 10/2016 | Ritter et al. | |

(Continued)

FOREIGN PATENT DOCUMENTS

| | | |
|---|---|---|
| JP | 2011-154900 | 8/2011 |
| JP | 2015-005398 | 1/2015 |

(Continued)

OTHER PUBLICATIONS

International Search Report of PCT application No. PCT/JP2019/039466 dated Dec. 17, 2019.

(Continued)

*Primary Examiner* — Cynthia H Kelly
*Assistant Examiner* — Monique M Wills
(74) *Attorney, Agent, or Firm* — Rimon P.C.

(57) ABSTRACT

A solid electrolyte according to the present disclosure includes first particles consisted of a first solid electrolyte material and second particles consisted of a second solid electrolyte material. The first solid electrolyte material has a higher ionic conductivity than the second solid electrolyte material. The second solid electrolyte material has a lower Young's modulus than the first solid electrolyte material.

21 Claims, 2 Drawing Sheets

(56) References Cited

U.S. PATENT DOCUMENTS

2018/0183084 A1    6/2018  Min et al.

FOREIGN PATENT DOCUMENTS

JP    2018-190513    11/2018
WO    2011/007445    1/2011

OTHER PUBLICATIONS

The Extended European Search Report dated Dec. 7, 2021 for the related European Patent Application No. 19885719.5.
Tatsumisago M et al: "All-solid-state lithium secondary batteries using sulfide-based glass-ceramic electrolytes", Functional Materials Letters: Fml, World Scientific Publishing Co. Pte. Ltd, SG, vol. 1, No. 1, Jan. 1, 2008(Jan. 1, 2008) , pp. 31-35, XP008149531.

* cited by examiner

SOLID ELECTROLYTE AND BATTERY USING SAME

BACKGROUND

1. Technical Field

The present disclosure relates to a solid electrolyte and a battery including the solid electrolyte.

2. Description of the Related Art

U.S. Patent Application Publication No. 2016/0293946 discloses an all-solid-state battery containing a lithium sulfide having an argyrodite crystal structure. Japanese Unexamined Patent Application Publication No. 2011-154900 discloses an all-solid-state battery having a solid electrolyte containing sulfide glass and sulfide crystal.

SUMMARY

One non-limiting and exemplary embodiment provides a solid electrolyte having a high ionic conductivity.

In one general aspect, the techniques disclosed here feature a solid electrolyte including first particles consisted of a first solid electrolyte material, and second particles consisted of a second solid electrolyte material. The first solid electrolyte material has a higher ionic conductivity than the second solid electrolyte material, and the second solid electrolyte material has a lower Young's modulus than the first solid electrolyte material.

The present disclosure provides a solid electrolyte having a high ionic conductivity. A battery including the solid electrolyte has a high energy density.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
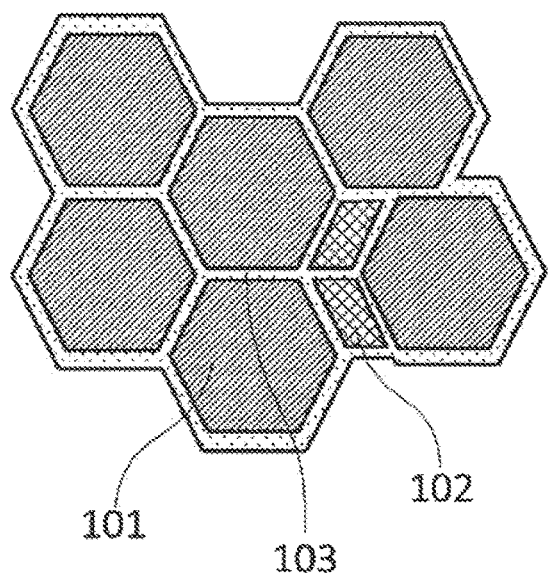
FIG. 1 is a schematic view of a solid electrolyte 1000 according to a first embodiment.

Embodiments of the present disclosure will be described below with reference to the drawings.

First Embodiment

A solid electrolyte according to a first embodiment contains first particles consisted of a first solid electrolyte material and second particles consisted of a second solid electrolyte material. The first solid electrolyte material has a higher ionic conductivity than the second solid electrolyte material. The second solid electrolyte material has a lower Young's modulus than the first solid electrolyte material.

In the first embodiment, the solid electrolyte having a high ionic conductivity is densely formed without structural defects. The solid electrolyte according to the first embodiment has a high effective ionic conductivity. A battery including the solid electrolyte according to the first embodiment has a high energy density. The effective ionic conductivity of the solid electrolyte as used herein refers to the ionic conductivity of the solid electrolyte in actual use. An example of the effective ionic conductivity refers to the ionic conductivity of the solid electrolyte contained in the battery.

In general, application of high pressure to solid electrolyte particles having a high Young's modulus and a high ionic conductivity tends to cause delamination between the particles because of the strain generated by the pressure and density distribution. In contrast, the solid electrolyte according to the first embodiment undergoes less delamination. The solid electrolyte according to the first embodiment thus has a high ionic conductivity (e.g., high effective ionic conductivity). Moreover, a battery including the solid electrolyte according to the first embodiment further has a high energy density.

In general, the ionic conductivity of the solid electrolyte formed of a green compact is measured with the solid electrolyte under high pressure in a mold. However, in general, a battery including a solid electrolyte is being released from high pressure.

Upon release of the solid electrolyte from pressure (e.g., upon exposure of the solid electrolyte to atmospheric pressure), uneven pressure distribution and spring-back strain causes structural defects, such as delamination, in the solid electrolyte. It is noted that, as a result, the ionic conductivity of the solid electrolyte measured under high pressure may greatly differ from the ionic conductivity of the solid electrolyte measured under atmospheric pressure.

The solid electrolyte according to the first embodiment may further contain a particle boundary layer consisted of a third solid electrolyte material. When the solid electrolyte according to the first embodiment contains a particle boundary layer, the particle boundary layer may have a thickness smaller than the particle size of the first particles and the particle size of the second particles. The third solid electrolyte material may have a Young's modulus lower than or equal to the Young's modulus of the second solid electrolyte material. The third solid electrolyte material may have a lower Young's modulus than the second solid electrolyte material. The presence of the particle boundary layer in the solid electrolyte according to the first embodiment further prevents or reduces delamination.

FIG. 1 is a schematic view of a solid electrolyte 1000 according to the first embodiment. The solid electrolyte according to the first embodiment will be described below with reference to FIG. 1.

The solid electrolyte 1000 contains first particles 101, second particles 102, and a particle boundary layer 103. The solid electrolyte 1000 may contain no particle boundary layer 103.

The first particles 101 are consisted of a first solid electrolyte material. The second particles 102 are consisted of a second solid electrolyte material. The first solid electrolyte material has a higher ionic conductivity than the second solid electrolyte material. The second solid electrolyte material has a lower Young's modulus than the first solid electrolyte material.

The particle boundary layer 103 may be present between the first particles 101 and the second particles 102.

The particle boundary layer 103 may be present between two adjacent first particles 101. Similarly, the particle boundary layer 103 may be present between two adjacent second particles 102.

The particle boundary layer 103 is consisted of a third solid electrolyte material.

The first particles 101 are connected to each other with the second particles 102 and the particle boundary layer 103 therebetween. The second particles 102 have a lower Young's modulus than the first particles 101. The particle boundary layer 103 also preferably has a lower Young's modulus than the first particles 101. The third solid electrolyte material preferably has a Young's modulus lower than or equal to the Young's modulus of the second solid electrolyte material.

The presence of the particle boundary layer 103 as described above prevents or reduces structural defects, such as delamination, even when the solid electrolyte 1000 is formed by compacting particles through the application of high pressure. As a result, the solid electrolyte has a high effective ionic conductivity. The mechanism by which the particle boundary layer 103 prevents or reduces structural defects, such as delamination, will be described below in detail.

Method for Manufacturing Solid Electrolyte 1000

An example method for manufacturing the solid electrolyte 1000 will be described below.

First, a powder of the first particles 101 and a powder of the second particles 102 are mixed to prepare a mixed powder.

As demonstrated in Example described below, the powder of the second particles 102 may contain a component for forming the particle boundary layer 103. The powder of the second particles 102 is, for example, a glass powder containing a sulfide containing lithium sulfide and phosphorus sulfide. The glass powder contains a crystalline component and an amorphous component. The second particles 102 and the particle boundary layer 103 each contain a crystalline component and an amorphous component.

Next, the mixed powder is pressed and formed into the solid electrolyte 1000. Hereinafter, such a manufacturing method is referred to as a "compaction process".

Since the second particles 102 have a lower Young's modulus than the first particles 101, the second particles 102 deform more easily than the first particles 101. Thus, the second particles 102 deform under pressure such that the second particles 102 fit to the shape of gaps between the first particles 101. As a result, the gaps are filled with the second particles 102. The dense solid electrolyte 1000 is produced accordingly.

Furthermore, the gaps in the solid electrolyte 1000 are made smaller by filling the gaps between the first particles 101 with the second particles 102. This configuration improves the ionic conductivity.

The term "particles" as used herein without distinguishing between the first particles 101 and the second particles 102 refers to the first particles 101 and the second particles 102. A gap between two adjacent particles is filled with the particle boundary layer 103. The surface of each particle is thus in contact with the particle boundary layer 103. The particle boundary layer 103 improves electrical connection between two adjacent particles. In other words, if the particle boundary layer 103 is absent, part of the surface of one particle has not only contact portions in direct contact with the surfaces of adjacent particles but also non-contact portions out of contact with the surfaces of other particles. When the gaps are filled with the particle boundary layer 103, the particle boundary layer 103 is in contact with the non-contact portions. Accordingly, the non-contact portions are in indirect contact with the surfaces of other particles with the particle boundary layer 103 therebetween. The particle boundary layer 103 thus improves electrical connection between two adjacent particles. It is noted that the first particles 101, the second particles 102, and the particle boundary layer 103 are all consisted of a solid electrolyte material.

The solid electrolyte 1000 thus has a microstructure. In the microstructure, the soft second particles 102 are present between the hard first particles 101 having a high Young's modulus such that the gaps between the first particles 101 are filled with the second particles 102.

The particle boundary layer 103 may be present between the first particles 101 such that the gaps between the first particles 101 are filled with the particle boundary layer 103. Similarly, the particle boundary layer 103 may be present between the second particles 102 such that the gaps between the second particles 102 are filled with the particle boundary layer 103.

The stress is generated by spring back and uneven pressure distribution after pressure release, but the stress is absorbed by the ion-conductive soft structure (i.e., the structure composed of the second particles 102 and the particle boundary layer 103). Such compaction of the particles under high pressure to form the solid electrolyte 1000 prevents or reduces structural defects, such as delamination, in the solid electrolyte 1000. As a result, the solid electrolyte 1000 has a high ionic conductivity, a high density, and a high effective ionic conductivity. Furthermore, a battery including the solid electrolyte 1000 having a high effective ionic conductivity has a high energy density. Again, the microstructure may contain no particle boundary layer 103.

As described above, the first particles 101, the second particles 102, and the particle boundary layer 103 are all consisted of a solid electrolyte material. The particle boundary layer 103 has a thickness smaller than the size of the first particles 101 and the size of the second particles 102. The thickness of the particle boundary layer 103 is, for example, $1/10$ or less of the particle size of the first particles 101 and $1/10$ or less of the particle size of the second particles 102. The particle boundary layer 103 may have a thickness of, for example, 2 nanometers or more and 30 nanometers or less.

The third solid electrolyte material may have a lower ionic conductivity than the first solid electrolyte material and the second solid electrolyte material. Since the third solid electrolyte material is very thin as described above, the third solid electrolyte material does not have a great effect on the ionic conductivity of the entire solid electrolyte 1000.

Examples of the solid electrolyte materials used for the first particles 101, the second particles 102, and the particle boundary layer 103 include known solid electrolyte materials used for batteries. Needless to say, the solid electrolyte materials conduct metal ions, such as Li ions or Mg ions.

Examples of the solid electrolyte materials include sulfides, oxides, and halides.

Examples of sulfides include $Li_2S$—$P_2S_5$, $Li_2S$—$SiS_2$, $Li_2S$—$B_2S_3$, $Li_2S$—$GeS_2$, $Li_2S$—$SiS_2$—$LiI$, $Li_2S$—$SiS_2$-$LiaPO_4$, $Li_2S$—$Ge_2S_2$, $Li_2S$—$GeS_2$—$P_2S_5$, and $Li_2SGeS_2$—$ZnS$.

Examples of halides include compounds having Li, M', and X'. M' is at least one element selected from the group consisting of metal elements other than Li and metalloid elements. X' is at least one element selected from the group consisting of F, Cl, Br, and I. The "metal elements" refer to all elements (except hydrogen) included in group 1 elements to group 12 elements in the periodic table and all elements (except B, Si, Ge, As, Sb, Te, C, N, P, O, S, and Se) included in group 13 elements to group 16 elements in the periodic table. The "metalloid elements" refer to B, Si, Ge, As, Sb, and Te. For example, M' may include Y (=yttrium). Examples of halides containing Y include Li3YCl6 and Li3YBr6.

Examples of oxides include oxides mainly containing a Li—Al—(Ge,Ti)—P—O material or a garnet material, such as $Li_7La_3Zr_2O_{12}$.

Examples of the solid electrolyte materials further include lithium-containing metal oxides, lithium-containing metal nitrides, lithium phosphate (i.e., $Li_3PO_4$), and lithium-containing transition metal oxides.

Examples of lithium-containing metal oxides include $Li_2$—$SiO_2$ and $Li_2$—$SiO_2$—$P_2O_5$.

Examples of lithium-containing metal nitrides include $Li_{2.9}PO_{3.3}N_{0.46}$, called LIPON.

Examples of lithium-containing transition metal oxides include lithium titanium oxide.

The solid electrolyte materials used for the first particles 101 and the second particles 102 are selected from the above solid electrolyte materials so as to have a Young's modulus and an ionic conductivity as described above.

The solid electrolyte material used for the particle boundary layer 103 may also be selected from the above solid electrolyte materials so as to have a Young's modulus and an ionic conductivity as described above.

The solid electrolyte 1000 may contain a binder in addition to the solid electrolyte materials. Examples of the binder include polyethylene oxide and polyvinylidene fluoride.

To increase the ionic conductivity of the solid electrolyte 1000, the first solid electrolyte material may contain at least one selected from the group consisting of a sulfide, an oxide, and a halide.

To increase the ionic conductivity of the solid electrolyte 1000, the first solid electrolyte material may contain an argyrodite sulfide. The argyrodite sulfide has an inherently high ionic conductivity.

Examples of the argyrodite sulfide include sulfides having an argyrodite crystal structure and represented by composition formula $Li_\alpha PS_\beta Cl_\gamma$ (where $5.5 \le \alpha \le 6.5$, $4.5 \le \beta \le 5.5$, and $0.5 \le \gamma \le 1.5$).

Examples of the composition of the argyrodite sulfide represented by composition formula $Li_\alpha PS_\beta Cl_\gamma$ include $Li_6PS_5Cl$. $Li_6PS_5Cl$ has an inherently high ionic conductivity in the form of green compact. $Li_6PS_5Cl$ may have an ionic conductivity of, for example, 2 mS/cm or more and 3 mS/cm or less at room temperature (e.g., 25 degrees Celsius) under pressure in a mold. $Li_6PS_5Cl$ has a Young's modulus of about 0.2 GPa. The presence of $Li_6PS_5Cl$ in the first solid electrolyte material can increase the ionic conductivity of the solid electrolyte 1000.

To increase the ionic conductivity of the solid electrolyte 1000, the second solid electrolyte material may contain at least one selected from the group consisting of a sulfide, an oxide, and a halide.

To increase the ionic conductivity of the solid electrolyte 1000, the second solid electrolyte material may contain an LPS sulfide. The LPS sulfide refers to a sulfide containing lithium sulfide and phosphorus sulfide.

Examples of lithium sulfide contained in the LPS sulfide include $Li_pS$ (where $1.5 \le p \le 2.5$). Examples of phosphorus sulfide contained in the LPS sulfide include $P_qS_5$ (where $1.5 \le p \le 2.5$). In other words, the LPS sulfide may be $Li_pS$—$P_qS_5$. To increase the ionic conductivity of the solid electrolyte 1000, $Li_pS$—$P_qS_5$ may be, for example, $Li_2S$—$P_2S_5$.

To increase the ionic conductivity of the solid electrolyte 1000, the second solid electrolyte material may contain a glass sulfide containing a triclinic crystal as a main component.

The second solid electrolyte material may be an LPS sulfide glass electrolyte containing a triclinic crystal as a main component. Examples of the glass electrolyte include $Li_2S$—$P_2S_5$ ($Li_2S:P_2S_5$=70:30 (molar ratio). $Li_2S$—$P_2S_5$ ($Li_2S:P_2S_5$=70:30 (molar ratio) in the form of green compact has an ionic conductivity of about 0.7 mS/cm and a Young's modulus of about 0.09 GPa at room temperature (e.g., 25 degrees Celsius). When $Li_6PS_5Cl$ is used as the first solid electrolyte material, $Li_2S$—$P_2S_5$ ($Li_2S:P_2S_5$=70:30 (molar ratio)) may be used as a suitable second solid electrolyte material.

The particle boundary layer 103 functions as a connection layer that connects particles to each other between a first particle 101 and a second particle 102 that are adjacent to each other, between two adjacent first particles 101, and between two adjacent second particles 102. When the solid electrolyte 1000 is formed by the compaction process, the Young's modulus of the third solid electrolyte material is lower than or equal to the Young's modulus of the second particles 102. The third solid electrolyte material may have a smaller particle size than the first particles 101 and the second particles 102.

The third solid electrolyte material may have lower crystallinity than the second solid electrolyte material. When the third solid electrolyte material has lower crystallinity than the second solid electrolyte material, the particle boundary layer 103 effectively functions as a connection layer that connects particles to each other. Such compaction of the particles under high pressure to form the solid electrolyte 1000 prevents or reduces structural defects, such as delamination. As a result, the solid electrolyte has a high effective ionic conductivity.

The third solid electrolyte material may be amorphous. When the third solid electrolyte material is amorphous, the particle boundary layer 103 effectively functions as a connection layer that connects particles to each other. Such compaction of the particles under high pressure to form the solid electrolyte 1000 prevents or reduces structural defects, such as delamination. As a result, the solid electrolyte has a high effective ionic conductivity.

The third solid electrolyte material may belong to the same material group as the second solid electrolyte material. When the third solid electrolyte material belongs to the same material group as the second solid electrolyte material, the solid electrolyte 1000 has a stable structure from the viewpoint of connection and thermal expansion of the particles. Furthermore, the second particles 102 have substantially the same coefficient of thermal expansion as the particle boundary layer 103, and the solid electrolyte 1000 thus has high resistance to thermal shock and thermal cycle.

Examples of the third solid electrolyte material include (i) amorphous LPS glass and (ii) LPS glass having lower crystallinity than the second particles 102 and smaller particle size than the second particles 102.

The Young's modulus and ionic conductivity of glass electrolytes, such as LPS glass, change with temperature or history of heat treating. The crystallinity of glass electrolytes is thus appropriately controlled by adjusting heat treating conditions, and such glass electrolytes are used as the first to third solid electrolyte materials. The crystallinity of the powders of the solid electrolyte materials can be evaluated using the profile and full width at half maximum of X-ray diffraction.

The first particles 101 and the second particles 102 have a size larger than the thickness (typically, several tens nanometers or less) of the particle boundary layer 103. The first particles 101 and the second particles 102 may have an average particle size of about 0.1 micrometers or more and 10 micrometers or less. The average particle size refers to particle size D50 (cumulative 50% particle size) determined from the volume particle size distribution measured by using a laser diffraction particle size analyzer.

The microstructure of the solid electrolyte 1000 according to the first embodiment may be observed with a high-resolution transmission electron microscope (hereinafter, referred to as a "TEM"). Using the TEM, the crystals in the microstructures, like lattice patterns, of the first particles 101, the second particles 102, and the particle boundary layer 103 are observed.

In general, the same or similar chemical compositions have higher Young's modulus and higher ionic conductivity as the crystallinity increases.

The elemental analysis of the first particles 101, the second particles 102, and the particle boundary layer 103 can be conducted by using energy dispersive X-ray spectroscopy (hereinafter, referred to as "EDS") or an electron probe microanalyzer (hereinafter, EPMA).

The particles in the microstructure of the solid electrolyte 1000 according to the first embodiment can be evaluated by using direct probe analysis, such as a microprobe system. The ionic conductivity of the surfaces of the particles can be evaluated similarly.

The hardness (i.e., Young's modulus) of the particles in the solid electrolyte 1000 according to the first embodiment is evaluated from the deformation of the shape of the particles in the microstructure through TEM observation. For examples, the magnitude relationship of Young's modulus is determined in the order of undeformed particles, particles deformed by pressure, and the material forming the particle boundary layer 103 without maintaining the shape under pressure, from highest to lowest. The magnitude relationship of the Young's modulus of the particles is determined accordingly.

The magnitude relationship between the Young's modulus of the first particles 101 and the Young's modulus of the second particles 102 is specified through microstructure observation using the TEM as described above. Similarly, the magnitude relationship between the Young's modulus of the particle boundary layer 103 and the Young's modulus of the first particles 101 and the second particles 102 is also specified through microstructure observation using the TEM.

When it is difficult to specify the magnitude relationship of Young's modulus through microstructure observation using the TEM, or when it is necessary to determine the Young's modulus of the particles and the particle boundary layer 103, the following alternative methods can be used.

To measure an inherent Young's modulus, it is necessary to use a sample without structural defects. A portion without structural defects is selected as a sample, or a sample is processed into a sample without structural defects. Next, the Young's modulus of the sample is measured. Alternatively, for example, particles having a size of about several tens of micrometers and having no structural defects are used alone as a sample, and the Young's modulus of the particles is measured.

The relative relationship can be compared on the basis of displacement characteristics against pressure in response to insertion of a probe.

The relative softness of the particles also can also be estimated from the ratio (i.e., compressibility) of displacement to pressure in response to application of the pressure to the particles in a mold.

The second particles 102 may have a smaller particles size than the first particles 101. When the second particles 102 have a smaller particle size than the first particles 101, the second particles 102 deform easily. The gap between two adjacent first particles 101 is thus easily filled with a second particle 102. As a result, the solid electrolyte 1000 has a high ionic conductivity.

The particle boundary layer 103 may have a thickness of 10 nanometers or less. When the particle boundary layer 103 has a thickness of 10 nanometers or less, the connection strength between the particles is highly stable like microstructures of ordinary ceramics. This configuration further prevents or reduces delamination of the particles, and the solid electrolyte 1000 has a high ionic conductivity.

To increase the ionic conductivity of the solid electrolyte 1000, the following formula may be satisfied.

$$0.05 \leq (vp2+vgb)/(vp1+vp2+vgb) \leq 0.7$$

where vp1 represents the volume of the first particles 101, vp2 represents the volume of the second particles 102, and vgb represents the volume of the particle boundary layer 103.

To increase the ionic conductivity of the solid electrolyte 1000, the value of (vp2+vgb)/(vp1+vp2+vgb) may be 0.05 or more and 0.50 or less.

To increase the ionic conductivity of the solid electrolyte 1000, the value of (vp2+vgb)/(vp1+vp2+vgb) may be 0.05 or more and 0.30 or less.

To increase the ionic conductivity of the solid electrolyte 1000, the value of (vgb)/(vp2+vgb) may be 0.05 or more and 0.15 or less.

Hereinafter, example methods for manufacturing the solid electrolyte according to the first embodiment will be described in detail.

First, a manufacturing method where the second particles 102 and the particle boundary layer 103 are consisted of materials belonging to the same material group (i.e., the second solid electrolyte material and the third solid electrolyte material belong to the same material group) will be described.

A mixture of a powder of the first solid electrolyte material and a powder of the soft solid electrolyte material is pressed to form a solid electrolyte containing a microstructure containing the second particles 102 and the particle boundary layer 103. The soft solid electrolyte material has a lower Young's modulus than the first solid electrolyte material. Furthermore, the powder of the soft solid electrolyte material has crystallinity distribution. The crystallinity distribution will be described below.

The second solid electrolyte material (i.e., the soft solid electrolyte material) having crystallinity distribution is finally formed into the second solid electrolyte material and the third solid electrolyte material respectively constituting the second particles 102 and the particle boundary layer 103.

The powder of the soft solid electrolyte material having crystallinity distribution is roughly divided into a powder component having low crystallinity and the remaining component.

The powder component having low crystallinity is distributed on the particle surfaces of the first particles 101 at the initial stage of pressing so as to connect the particles to each other. The powder component having low crystallinity forms the particle boundary layer 103 accordingly.

The remaining component does not form the particle boundary layer 103. The remaining component finally forms the second particles 102 while having ionic conductivity in the microstructure.

This method stably forms the solid electrolyte 1000 having less structural defects and a high ionic conductivity.

When the second particles 102 and the particle boundary layer 103 are consisted of materials belonging to the same material group, the productivity is high, and the solid electrolyte tends to have a stable structure from the viewpoint of connection and thermal expansion of the second particles 102 and the particle boundary layer 103. In this case, the first particles 101 have higher crystallinity than the second particles 102, and the second particles 102 have crystallinity higher than or equal to that of the particle boundary layer 103. Since the ionic conductivity generally increases with increasing crystallinity, the first particles 101 have higher ionic conductivity than the second particles, and the second particles 102 have ionic conductivity higher than or equal to that of the particle boundary layer 103.

Since the second particles have substantially the same coefficient of thermal expansion as the particle boundary layer 103, the solid electrolyte 1000 has high resistance to thermal shock and thermal cycle.

When the second particles 102 and the particle boundary layer 103 are consisted of materials belonging to the same material group, the solid electrolyte 1000 may be produced by pressing a mixture of a powder of the first solid electrolyte material, a powder of the second solid electrolyte material, and a powder of the third solid electrolyte material.

Next, a manufacturing method where the second particles 102 and the particle boundary layer 103 are consisted of different materials will be described.

The solid electrolyte 1000 is produced by pressing a mixture of a powder of the first solid electrolyte material, a powder of the second solid electrolyte material, and a powder of the third solid electrolyte material.

The solid electrolyte 1000 may be formed by using composite particles prepared by coating the surfaces of the first particles 101 with at least one selected from the group consisting of the second particles 102 and the particle boundary layer 103.

The coating conditions can be checked by estimating the degree of compounding on the basis of the results of SEM observation or on the basis of a change in specific surface area observed by the BET method.

Second Embodiment

An energy storage device according to a second embodiment includes the solid electrolyte according to the first embodiment. The same matters as described in the first embodiment are appropriately omitted in the second embodiment.

A battery according to the second embodiment includes a positive electrode, a negative electrode, and an electrolyte layer between the positive electrode and the negative electrode. At least one selected from the group consisting of the positive electrode, the negative electrode, and the electrolyte layer contains the solid electrolyte according to the first embodiment.

Figure 2:
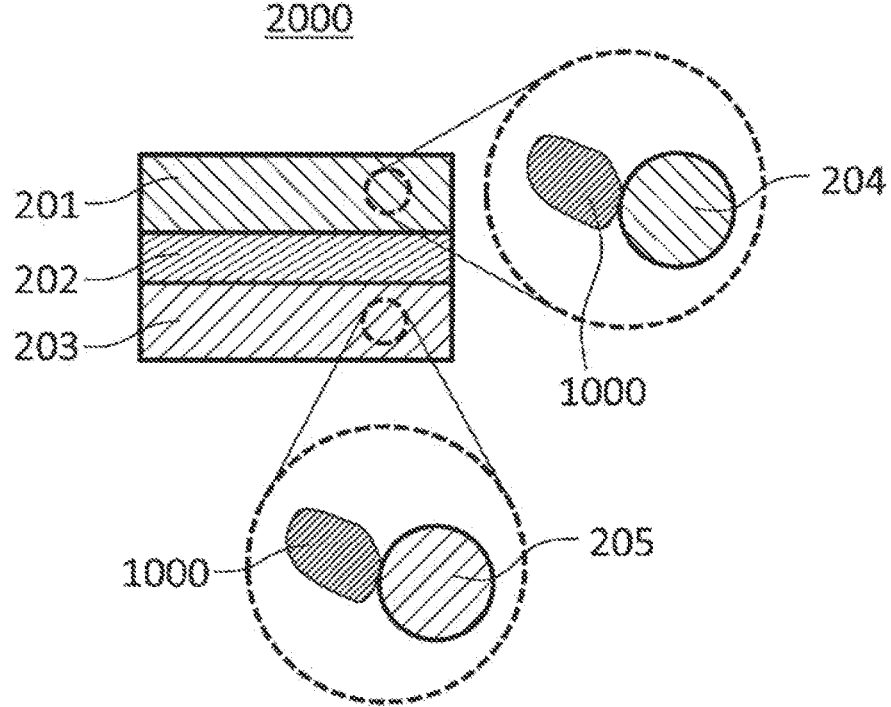
FIG. 2 is a cross-sectional view of a battery 2000 according to a second embodiment.

FIG. 2 is a cross-sectional view of a battery 2000 according to the second embodiment. Referring to FIG. 2, the battery 2000 according to the second embodiment includes a positive electrode 201, a negative electrode 203, and an electrolyte layer 202. The positive electrode 201 includes positive electrode active material particles 204 and the solid electrolyte 1000 according to the first embodiment. The electrolyte layer 202 is disposed between the positive electrode 201 and the negative electrode 203. The electrolyte layer 202 is in contact with both the positive electrode 201 and the negative electrode 203. The electrolyte layer 202 includes the solid electrolyte 1000 according to the first embodiment. The negative electrode 203 includes negative electrode active material particles 205 and the solid electrolyte 1000 according to the first embodiment. The battery 2000 is, for example, an all-solid lithium secondary battery. Since the battery 2000 according to the second embodiment includes the solid electrolyte 1000 described in the first embodiment, the battery 2000 has a high energy density. Since the solid electrolyte 1000 according to the first embodiment undergoes less delamination, the electrolyte layer 202 may be thin. The energy density of the battery is further improved by using the solid electrolyte 1000 according to the first embodiment in the electrolyte layer 202.

In the second embodiment, the positive electrode 201, the negative electrode 203, and the electrolyte layer 202 may each contain the solid electrolyte 1000. The electrolyte layer 202 may contain the solid electrolyte 1000 according to the first embodiment. Since the electrolyte layer 202 contains the largest amount of electrolyte material among the positive electrode 201, the negative electrode 203, and the electrolyte layer 202, the use of the solid electrolyte 1000 according to the first embodiment in the electrolyte layer 202 effectively improves the energy density. As long as at least one selected from the group consisting of the positive electrode 201, the negative electrode 203, and the electrolyte layer 202 contains the solid electrolyte 1000, the battery has a high energy density. The positive electrode 201, the negative electrode 203, and the electrolyte layer 202 may each further contain a solid electrolyte other than the solid electrolyte 1000 according to the first embodiment.

The positive electrode 201 contains a positive electrode active material, that is, a material into and from which metal ions can be intercalated and deintercalated. Examples of metal ions include lithium ion. The positive electrode 201 contains, for example, a positive electrode active material (e.g., positive electrode active material particles 204). The positive electrode 201 may contain the solid electrolyte 1000.

Examples of the positive electrode active material include lithium-containing transition metal oxides, lithium-free transition metal oxides, transition metal fluorides, polyanion materials, fluorinated polyanion materials, transition metal sulfides, transition metal oxyfluorides, transition metal oxysulfides, and transition metal oxynitrides. The use of a lithium-containing transition metal oxide as a positive electrode active material reduces the costs for manufacturing the battery 2000 and increases the average discharge voltage of the battery 2000.

The positive electrode 201 may contain, as a positive electrode active material, at least one selected from Li(Ni-CoAl)$O_2$ and LiCoO$_2$. These transition metal oxides may be used to increase the energy density of the battery 2000.

In the positive electrode 201, the percentage of the volume vc1 of the positive electrode active material particles 204 to the sum of the volume vc1 of the positive electrode active material particles 204 and the volume vc2 of the solid electrolyte 1000 is, for example, 30% or more and 95% or less. In other words, the volume ratio represented by formula vc1/(vc1+vc2) may be 0.3 or more and 0.95 or less. The percentage of the volume vc2 of the solid electrolyte 1000 to the sum of the volume vc1 of the positive electrode active material particles 204 and the volume vc2 of the solid electrolyte 1000 is, for example, 5% or more and 70% or less. In other words, the volume ratio represented by formula vc2/(vc1+vc2) may be 0.05 or more and 0.70 or less. Appropriate control of the amount of the positive electrode active material particles 204 and the amount of the solid electrolyte 1000 allows the battery 2000 to have a sufficient energy density and operate with high output power.

The positive electrode 201 may have a thickness of 10 micrometers or more and 500 micrometers or less. Appropriate control of the thickness of the positive electrode 201 allows the battery 2000 to have a sufficient energy density and operate with high output power.

As described above, the electrolyte layer 202 may contain the solid electrolyte 1000 according to the first embodiment. The electrolyte layer 202 may contain not only the solid electrolyte 1000 according to the first embodiment but also a solid electrolyte other than the solid electrolyte according to the first embodiment.

Hereinafter, the solid electrolyte 1000 according to the first embodiment is referred to as a first solid electrolyte. The solid electrolyte other than the solid electrolyte according to the first embodiment is referred to as a second solid electrolyte.

When the electrolyte layer 202 contains not only the first solid electrolyte but also the second solid electrolyte, the first solid electrolyte and the second solid electrolyte may be uniformly dispersed in the electrolyte layer 202. The second solid electrolyte may have a different composition from the first solid electrolyte. The second solid electrolyte may have a different structure from the first solid electrolyte.

The electrolyte layer 202 may have a thickness of 1 micrometer or more and 500 micrometers or less. Appropriate control of the thickness of the electrolyte layer 202 can assuredly prevent short-circuiting between the positive electrode 201 and the negative electrode 203 and enables high-output operation of the battery 2000.

The negative electrode 203 contains a negative electrode active material, that is, a material into and from which metal ions can be intercalated and deintercalated. Examples of metal ions include lithium ion. The negative electrode 203 contains, for example, a negative electrode active material (e.g., negative electrode active material particles 205). The negative electrode 203 may contain the solid electrolyte 1000.

Examples of the negative electrode active material include metal materials, carbon materials, oxides, nitrides, tin compounds, and silicon compounds. The metal materials may be single metals or alloys. Examples of the metal materials include lithium metal and lithium alloys. Examples of the carbon materials include natural graphite, coke, partially graphitized carbon, carbon fiber, spherical carbon, artificial graphite, and amorphous carbon. From the viewpoint of capacity density, the negative electrode active material may be preferably at least one selected from the group consisting of silicon (i.e., Si), tin (i.e., Sn), silicon compounds, and tin compounds.

In the negative electrode 203, the percentage of the volume va1 of the negative electrode active material particles 205 to the sum of the volume va1 of the negative electrode active material particles 205 and the volume va2 of the solid electrolyte 1000 is, for example, 30% or more and 95% or less. In other words, the volume ratio represented by formula va1/(va1+va2) may be 0.3 or more and 0.95 or less. The percentage of the volume va2 of the solid electrolyte 1000 to the sum of the volume va1 of the negative electrode active material particles 205 and the volume va2 of the solid electrolyte 1000 is, for example, 5% or more and 70% or less. In other words, the volume ratio represented by formula va2/(va1+va2) may be 0.05 or more and 0.70 or less. Appropriate control of the amount of the negative electrode active material particles 205 and the amount of the solid electrolyte 1000 allows the battery 2000 to have a sufficient energy density and operate with high output power.

The negative electrode 203 may have a thickness of 10 micrometers or more and 500 micrometers or less. Appropriate control of the thickness of the negative electrode 203 allows the battery 2000 to have a sufficient energy density and operate with high output power.

The second solid electrolyte may be a sulfide solid electrolyte. The sulfide solid electrolyte may be contained in the positive electrode 201, the negative electrode 203, and the electrolyte layer 202. Examples of the sulfide solid electrolyte material include $Li_2S$—$P_2S_5$, $Li_2S$—$SiS_2$, $Li_2SB_2S_3$, $Li_2S$—$GeS_2$, $Li_{3.25}Ge_{0.25}P_{0.75}S_4$, and $Li_{10}GeP_2S_{12}$. To the sulfide solid electrolyte material, LiX (X is F, Cl, Br, or I), $Li_2O$, $MO_q$, or $Li_pMO_q$ (M is P, Si, Ge, B, Al, Ga, In, Fe, or Zn, p is a natural number, and q is a natural number) may be added. The sulfide solid electrolyte material improves the ionic conductivity of the solid electrolyte 1000.

The second solid electrolyte may be an oxide solid electrolyte. The oxide solid electrolyte may be contained in the positive electrode 201, the negative electrode 203, and the electrolyte layer 202. The oxide solid electrolyte material improves the ionic conductivity of the solid electrolyte 1000.

Examples of the oxide solid electrolyte include: (i) NASICON solid electrolytes, such as $LiTi_2(PO_4)_3$ and element-substituted products thereof; (ii) (LaLi)$TiO_3$-based perovskite solid electrolytes; (iii) LISICON solid electrolytes, such as $Li_{14}ZnGe_4O_{16}$, $Li_4SiO_4$, $LiGeO_4$, and element-substituted products thereof; (iv) garnet solid electrolytes, such as $Li_7La_3Zr_2O_{12}$ and element-substituted products thereof; (v) $Li_3N$ and H-substituted products thereof; and (vi) $Li_3PO_4$ and N-substituted products thereof.

The second solid electrolyte may be a halogenated solid electrolyte. The halogenated solid electrolyte may be contained in the positive electrode 201, the negative electrode 203, and the electrolyte layer 202. The halogenated solid electrolyte material improves the ionic conductivity of the solid electrolyte 1000.

Examples of the halogenated solid electrolyte include $Li_2MgX'_4$, $Li_2FeX'_4$, $Li(Al,Ga,In)X'_4$, $Li_3(Al,Ga,In)X'_6$, LiOX', and LiX', where X' is at least one element selected from the group consisting of F, Cl, Br, and I. Examples of the halogenated solid electrolyte include $Li_3InBr_6$, $Li_3InCl_6$, $Li_2FeCl_4$, $Li_2CrCl_4$, $Li_3OCl$, and LiI.

The second solid electrolyte may be a complex hydride solid electrolyte. The complex hydride solid electrolyte may be contained in the positive electrode 201, the negative electrode 203, and the electrolyte layer 202. The complex hydride solid electrolyte material improves the ionic conductivity of the solid electrolyte 1000.

Examples of the complex hydride solid electrolyte include $LiBH_4$—LiI and $LiBH_4$—$P_2S_5$.

The second solid electrolyte may be an organic polymer solid electrolyte. The organic polymer solid electrolyte may be contained in the positive electrode 201, the negative electrode 203, and the electrolyte layer 202. The organic polymer solid electrolyte material improves the ionic conductivity of the solid electrolyte 1000.

Examples of the organic polymer solid electrolyte include compounds composed of a polymer compound and a lithium salt. The polymer compound may have an ethylene oxide structure. The polymer compound having an ethylene oxide structure can contain more lithium salt and thus can further improve ionic conductivity. Examples of the lithium salt include $LiPF_6$, $LiBF_4$, $LiSbF_6$, $LiAsF_6$, $LiSO_3CF_3$, LiN $(SO_2CF_3)_2$, $LiN(SO_2C_2F_5)_2$, $LiN(SO_2CF_3)(SO_2C_4F_9)$, and $LiC(SO_2CF_3)_3$. One of these lithium salts may be used alone. Alternatively, two or more of these lithium salts may be used as a mixture.

At least one selected from the positive electrode 201, the negative electrode 203, and the electrolyte layer 202 may contain a non-aqueous electrolyte solution, a gel electrolyte, or an ionic liquid for the purpose of facilitating exchange of lithium ions and improving the output characteristics of the battery 2000.

The non-aqueous electrolyte solution contains a non-aqueous solvent and a lithium salt dissolved in the non-aqueous solvent.

Examples of the non-aqueous solvent include cyclic carbonate solvents, chain carbonate solvents, cyclic ether solvents, chain ether solvents, cyclic ester solvents, chain ester solvents, and fluorinated solvents.

Examples of the cyclic carbonate solvents include ethylene carbonate, propylene carbonate, and butylene carbonate.

Examples of the chain carbonate solvents include dimethyl carbonate, ethyl methyl carbonate, and diethyl carbonate.

Examples of the cyclic ether solvents include tetrahydrofuran, 1,4-dioxane, and 1,3-dioxolane.

Examples of the chain ether solvents include 1,2-dimethoxyethane and 1,2-diethoxyethane.

Examples of the cyclic ester solvents include γ-butyrolactone.

Examples of the chain ester solvents include methyl acetate.

Examples of the fluorinated solvents include fluoroethylene carbonate, methyl fluoropropionate, fluorobenzene, fluoroethyl methyl carbonate, and fluorodimethylene carbonate.

One of these non-aqueous solvents may be used alone, or two or more of these non-aqueous solvents may be used as a mixture.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$.

One of these lithium salts may be used alone, or two or more of these lithium salts may be used as a mixture.

The lithium salt may have a concentration of 0.5 mol/L or more and 2 mol/L or less.

An example of the gel electrolyte is a polymer material impregnated with a non-aqueous electrolyte solution. Examples of the polymer material include polyethylene oxide, polyacrylonitrile, polyvinylidene fluoride, and polymethyl methacrylate. Other examples of the polymer material include polymers having an ethylene oxide bond.

Examples of the cation contained in the ionic liquid include: (i) chain aliphatic quaternary ammonium salt cations, such as tetraalkylammonium; (ii) chain aliphatic quaternary phosphonium salt cations, such as tetraalkylphosphonium; (iii) alicyclic ammoniums, such as pyrrolidinium, morpholinium, imidazolinium, tetrahydropyrimidinium, piperazinium, and piperidinium; and (iv) nitrogen-containing heterocyclic aromatic cations, such as pyridinium and imidazolium.

Examples of the cation forming the ionic liquid include $PF_6^-$, $BF_4^-$, $SbF_5^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$.

The ionic liquid may contain a lithium salt.

At least one selected from the positive electrode 201, the negative electrode 203, and the electrolyte layer 202 may contain a binder for the purpose of improving the adhesion between the particles.

Examples of the binder include polyvinylidene fluoride, polytetrafluoroethylene, polyethylene, polypropylene, aramid resin, polyamide, polyimide, polyamideimide, polyacrylonitrile, poly(acrylic acid), poly(methyl acrylate), poly(ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyether, polyethersulfone, hexafluoropolypropylene, styrene-butadiene rubber, and carboxymethylcellulose.

Copolymers may also be used as a binder. Examples of such a binder include copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene.

A mixture of two or more selected from the above materials may be used as a binder.

At least one selected from the positive electrode 201 and the negative electrode 203 may contain a conductive assistant for the purpose of improving electronic conductivity.

Examples of the conductive assistant include: (i) graphites, such as natural graphite and artificial graphite; (ii) carbon blacks, such as acetylene black and Ketjenblack; (iii) conductive fibers, such as carbon fibers and metal fibers; (iv) fluorinated carbon; (v) metal powders, such as aluminum powder; (vi) conductive whiskers, such as zinc oxide whisker and potassium titanate whisker; (vii) conductive metal oxides, such as titanium oxide; and (viii) conductive polymer compounds, such as polyaniline, polypyrrole, and polythiophene.

The shape of the conductive assistant is not limited. Examples of the shape of the conductive assistant include needle shape, scale shape, spherical shape, and ellipsoidal shape. The conductive assistant may be in the form of particles.

The positive electrode active material particles 204 and the negative electrode active material particles 205 may be coated with a coating material for the purpose of reducing surface resistance. The surfaces of the positive electrode active material particles 204 may be only partially coated with a coating material. Alternatively, the surfaces of the positive electrode active material particles 204 may be entirely coated with a coating material. Similarly, the surfaces of the negative electrode active material particle 205 may be only partially coated with a coating material. Alternatively, the surfaces of the negative electrode active material particle 205 may be entirely coated with a coating material.

Examples of the coating material include solid electrolytes, such as sulfide solid electrolytes, oxide solid electrolytes, halogenated solid electrolytes, polymer solid electrolytes, and complex hydride solid electrolytes. The coating material may be an oxide solid electrolyte. The oxide solid electrolyte has good high-potential stability. The use of an oxide solid electrolyte as a coating material improves the charge/discharge efficiency of the battery 2000.

Examples of the oxide solid electrolyte that can be used as a coating material include: (i) Li—Nb—O compounds, such as $LiNbO_3$; (ii) Li—B—O compounds, such as $LiBO_2$ and $Li_3BO_3$; (iii) Li—Al—O compounds, such as $LiAlO_2$; (iv) Li—Si—O compounds, such as $Li_4SiO_4$; (v) $Li_2SO_4$; (vi) Li—Ti—O compounds, such as $Li_4Ti_5O_{12}$; (vii) Li—Zr—O compounds, such as $Li_2ZrO_3$; (viii) Li—Mo—O compounds, such as $Li_2MoO_3$; (ix) Li-V-O compounds, such as $LV_2O_5$; and (x) Li—W—O compounds, such as $Li_2WO_4$.

Figure 3:
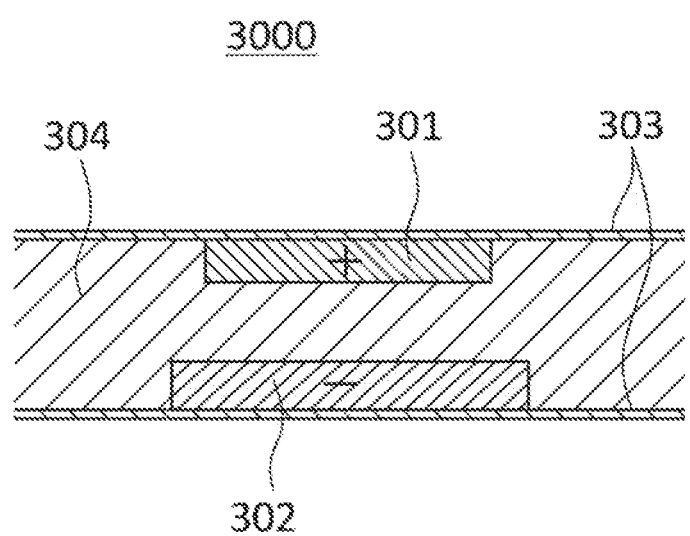
FIG. 3 is a cross-sectional view of a battery 3000 according to a modification of the second embodiment.

FIG. 3 is a cross-sectional view of a battery 3000 according to a modification of the second embodiment. Referring to FIG. 3, a battery 3000 includes a positive electrode including a positive electrode active material layer 301 and a current collector 303; a negative electrode including a negative electrode active material layer 302 and a current collector 303; and an electrolyte layer 304 between the positive electrode and the negative electrode. In the positive electrode, the positive electrode active material layer 301 is disposed on the current collector 303. In the negative electrode, the negative electrode active material layer 302 is disposed on the current collector 303. The electrolyte layer 304 contains the solid electrolyte according to the first embodiment.

The positive electrode active material layer 301 contains the positive electrode active material described above. The negative electrode active material layer 302 contains the negative electrode active material described above. The current collectors 303 are consisted of any material having electrical conductivity. The current collectors 303 are formed of, for example, a metal film, such as copper foil.

Like the battery 2000, the battery 3000 has a high energy density since the battery 3000 includes the solid electrolyte according to the first embodiment.

EXAMPLE

Solid Electrolyte

In Example, the solid electrolyte 1000 shown in FIG. 1 was manufactured.

An argyrodite sulfide was used as the first solid electrolyte material. Specifically, a powder of sulfide solid electrolyte $Li_6PS_5Cl$ having an argyrodite structure (available from Ampcera Inc.) was used.

As a material containing the second solid electrolyte material and the third solid electrolyte material, a glass powder of $Li_2S$—$P_2S_5$ ($Li_2S:P_2S_5$=70:30 (molar ratio) was used. Hereinafter, the glass powder is referred to as an "LPS glass powder".

The LPS glass powder was annealed at 200 degrees Celsius. The annealed LPS glass powder contained a triclinic crystal as a main component. The annealed LPS glass powder had a wide crystallinity distribution from crystalline to amorphous. The annealed LPS glass powder had an average particle size of 5 micrometers.

The annealed LPS glass powder was classified by using an ultrasonic vibration sieve with a micromesh having a maximum aperture of 8 micrometers. The volume ratio of the LPS glass powder that had passed through the micromesh to the entire LPS glass powder was about 0.1. The LPS glass powder that had passed through the micromesh contained many particles that did not undergo necking.

The LPS glass powder that had passed through the micromesh was subjected to X-ray diffraction analysis. Since no clear peak was observed in the X-ray diffraction pattern, the LPS glass powder that had passed through the micromesh was determined to contain many particles that did not undergo sintering and crystallization. In other words, it was determined that the powder that had passed through the micromesh might be used as a material of the particle boundary layer 103.

The result of classification reveals that the component of the second particles 102, serving as a crystalline component, accounted for 90 vol %, and the component of the particle boundary layer 103, serving as an amorphous component, accounted for 10 vol %.

The weight of the powder of sulfide solid electrolyte $Li_6PS_5Cl$ having an argyrodite structure, and the weight of the annealed LPS glass powder were measured so as to have the proportions shown in Table 1. Next, these powders were mixed well with each other in an agate mortar under dry conditions for about 30 minutes to provide a mixed powder in which these powders were uniformly dispersed.

Next, the mixed powder was placed in a mold. A pressure of 800 MPa was applied to the mixed powder by using a uniaxial pressing machine at a temperature of 120 degrees Celsius for 10 minutes to provide a solid electrolyte formed of a disc-shaped green compact sample. The solid electrolyte was taken out of the mold. The solid electrolyte was produced accordingly.

Next, the effective ionic conductivity of the obtained solid electrolyte was measured in the following manner. As described in the embodiments, the ionic conductivity of the solid electrolyte measured under high pressure may greatly differ from the ionic conductivity of the solid electrolyte measured under atmospheric pressure. As described below, the ionic conductivity of the solid electrolyte contained in the battery was measured as an effective ionic conductivity in Example.

A first indium foil and a second indium foil were placed on the upper surface and the lower surface of the solid electrolyte, respectively. The first indium foil and the second indium foil each had a thickness of 50 micrometers. Next, a pressure was applied between the upper surface and the lower surface of the solid electrolyte through the first indium foil and the second indium foil. The first indium foil and the second indium foil were accordingly attached to the upper surface and the lower surface of the solid electrolyte, respectively. Finally, the solid electrolyte was released from pressure. A battery including the first indium foil, the solid electrolyte, and the second indium foil was produced accordingly.

Subsequently, the battery was placed in a thermostatic chamber maintained at 25° C.±1° C.

The atmosphere was present in the thermostatic chamber. The pressure inside the thermostatic chamber was atmospheric pressure.

While the battery was placed in the thermostatic chamber, the impedance of the solid electrolyte was measured by using an impedance measuring system (product name: 12608W available from Solartron Analytical) at frequencies from 110 Hz to 10 MHz through the first indium foil and the second indium foil, and the effective ionic conductivity of the solid electrolyte contained in the battery was calculated.

The effective ionic conductivity of the solid electrolytes according to Sample 1 to Sample 7 was shown in Table 2.

Secondary Battery

A method for manufacturing a secondary battery will be described below. In Example, the secondary battery 3000 shown in FIG. 3 was manufactured.

First, a positive electrode paste, a negative electrode paste, and an electrolyte paste were prepared.

Positive Electrode Paste

The positive electrode paste contained a solid electrolyte material and a positive electrode active material.

The solid electrolyte material was a crystalline glass powder of argyrodite sulfide solid electrolyte $Li_6PS_5Cl$. The crystalline glass powder had an average particle size of 2 micrometers. The sulfide solid electrolyte $Li_6PS_5Cl$ had an ionic conductivity of about 2 mS/cm to 3 mS/cm.

The positive electrode active material was a powder of layered LiNiCoAl composite oxide represented by chemical formula $LiNi_{0.8}Co_{0.15}Al_{0.05}O_2$. The layered LiNiCoAl composite oxide had an average particle size of about 5 micrometers.

The positive electrode paste was prepared in the following manner.

The solid electrolyte material and the positive electrode active material were mixed with each other and next uniformly dispersed in each other to provide a mixture. Next, hydrogenated styrene-based thermoplastic elastomer (hereinafter referred to as "SEBS") and tetralin were added to the mixture, and the mixture was then mixed well using a planetary centrifugal mixer at room temperature (i.e., 25 degrees Celsius) at a rotation speed of 1600 rpm for about 20 minutes to produce a positive electrode paste. SEBS and tetralin were used as an organic binder and a solvent, respectively.

Negative Electrode Paste

The negative electrode paste also contained a solid electrolyte material and a negative electrode active material.

Like the positive electrode paste, the solid electrolyte material was a crystalline glass powder of argyrodite sulfide solid electrolyte $Li_6PS_5Cl$. The crystalline glass powder had an average particle size of 2 micrometers.

The negative electrode active material was a natural graphite powder having an average particle size of about 10 micrometers.

The negative electrode paste was prepared in the same manner as that for the positive electrode paste.

Electrolyte Paste

To the solid electrolyte according to Sample 1 to Sample 7, SEBS and tetralin were added. Next, the mixture was mixed well using a planetary centrifugal mixer at room temperature (i.e., 25 degrees Celsius) at a rotation speed of 1600 rpm for about 20 minutes to produce an electrolyte paste. SEBS and tetralin were used as an organic binder and a solvent, respectively.

The positive electrode paste was applied to copper foil having a thickness of about 20 micrometers by screen printing. The applied positive electrode paste was dried under vacuum at about 100 degrees Celsius for 1 hour to form the positive electrode active material layer 301 on the copper foil. The copper foil functioned as the current collector 303. The positive electrode active material layer 301 had a thickness of about 60 micrometers.

Next, the electrolyte paste was applied to the positive electrode active material layer 301 by using a metal mask and a squeegee. The applied electrolyte paste had a thickness of about 100 micrometers. Next, the electrolyte paste was dried under vacuum at about 100° C. for 1 hour. A positive electrode having the electrolyte layer 304 on its surface was produced accordingly.

The surface of the electrolyte layer 304 was observed with an optical microscope at a magnification of 50 times. As a result, no cracking was observed on the surface of the electrolyte layer 304.

The copper foil having the electrolyte layer 304 was carefully handled to keep the electrolyte layer 304 from impacts and deformation which cause structural defects inside the electrolyte layer 304.

The negative electrode paste was applied to copper foil having a thickness of about 20 micrometers by screen printing. The applied negative electrode paste was dried under vacuum at about 100° C. for 1 hour to form the negative electrode active material layer 302 on the copper foil. The copper foil functioned as the current collector 303. The negative electrode active material layer 302 had a thickness of about 80 micrometers.

Next, a negative electrode having the electrolyte layer 304 on its surface was produced in the same manner as that for the positive electrode. No cracking was also observed on the surface of the electrolyte layer 304 of the negative electrode.

Next, the positive electrode and the negative electrode were stacked on top of each other such that the surface of the electrolyte layer 304 of the positive electrode comes into contact with the surface of the electrolyte layer 304 of the negative electrode. A multilayer body was produced accordingly. An elastic sheet was stacked on each of the upper surface and the lower surface of the multilayer body. Each elastic sheet had an elastic modulus of about $5 \times 10^6$ Pa and a thickness of 70 micrometers. Next, the multilayer body was placed in a mold. The multilayer body was pressed in the mold at a pressure of 800 MPa for 100 seconds while being heated to 50° C. The multilayer body was taken out of the mold, and two elastic sheets were carefully removed so as not to damage the multilayer body. A secondary battery having a rectangular parallelepiped shape was produced accordingly.

A terminal electrode was attached to each of the surfaces of the current collectors 303 (i.e., copper foil) of the secondary battery such that a lead terminal was bonded to each of the surfaces of the current collectors 303 by using an Ag-based high-conductive adhesive.

The charging/discharging characteristics (i.e., charge capacity, discharge capacity, and charge/discharge efficiency) of the secondary battery were evaluated. In other words, the charge capacity, discharge capacity, and charge/discharge efficiency in the first measurement were measured at 0.05 C at room temperature (i.e., about 25 degrees Celsius).

Furthermore, the cross section of the secondary battery was observed. Specifically, the secondary battery was cut by using a Thomson blade so that the cross section of a central portion of the secondary battery was exposed. The exposed entire cross section was observed with an optical microscope at a magnification of 50 times to determine whether the inner structure of the secondary battery had structural defects, such as delamination. Five secondary batteries for each sample were used for cross-section observation. The results of the cross-section observation are shown in Table 2. In the column of "structural defects" in Table 2, the number of secondary batteries having structural defects observed in the cross section among five secondary batteries is shown as the numerator. Needless to say, the denominator is 5.

TABLE 1

| | Solid Electrolyte | |
| --- | --- | --- |
| Sample Number | Component (i.e., First Solid Electrolyte Material) of First Particles (vol %) | Components (i.e., Second and Third Electrolyte Materials) of Second Particles and Particle Boundary Layer (vol %) |
| 1 | 100 | 0 |
| 2 | 95 | 5 |

TABLE 1-continued

Solid Electrolyte

| Sample Number | Component (i.e., First Solid Electrolyte Material) of First Particles (vol %) | Components (i.e., Second and Third Electrolyte Materials) of Second Particles and Particle Boundary Layer (vol %) |
|---|---|---|
| 3 | 90 | 10 |
| 4 | 70 | 30 |
| 5 | 50 | 50 |
| 6 | 30 | 70 |
| 7 | 0 | 100 |

TABLE 2

Battery

| Sample Number | Effective Ionic Conductivity [mS/cm] | Charge Capacity [mAh/g] | Discharge Capacity mAh/g] | Charge/ Discharge Efficiency [%] | Structural Defects (Number of Batteries Having Structural Defects/5) |
|---|---|---|---|---|---|
| 1 | 0.28 | 148 | 101 | 68.2 | 5/5 |
| 2 | 4.36 | 209 | 180 | 86.1 | 0/5 |
| 3 | 4.59 | 210 | 182 | 86.7 | 0/5 |
| 4 | 4.68 | 212 | 185 | 87.3 | 0/5 |
| 5 | 2.21 | 209 | 177 | 84.7 | 0/5 |
| 6 | 1.98 | 205 | 170 | 82.9 | 0/5 |
| 7 | 1.75 | 195 | 152 | 77.9 | 0/5 |

The comparison of Sample 2 to Sample 6 with Sample 1 and Sample 7 shows that the addition of the LPS glass powder to the component (i.e., argyrodite sulfide) of the first particles allows batteries to have no structural defects and have a high effective ionic conductivity of 1.98 mS/cm or more.

Since the batteries have no structural defects, the inventors believe that delamination is suppressed during pressing. It is noted that the LPS glass powder forms the second particles 102 and the particle boundary layer 103 (second particles 102: particle boundary layer 103=90 vol %:10 vol %).

The secondary batteries according to Sample 2 to Sample 6 have a charge capacity of more than 200 mAh/g. Furthermore, the secondary batteries according to Sample 2 to Sample 6 have a higher charge/discharge efficiency (i.e., a charge/discharge efficiency of about 80% or more) than the secondary batteries according to Sample 1 and Sample 7.

The secondary batteries according to Sample 2 to Sample 6 had a charge capacity of more than 200 mAh/g and a charge/discharge efficiency of 80% or more.

The results of Sample 2 to Sample 3 together with the results of Sample 4 to Sample 6 show that, even when the LPS glass powder accounted for a volume ratio of 30% or more, the secondary batteries had a high ionic conductivity of 1.98 mS/cm or more and had no structural defects.

The comparison of Sample 2 to Sample 4 with Sample 5 and Sample 6 shows that, when the LPS glass powder accounts for a volume ratio of less than 50% (preferably 5% or more and less than 50%, more preferably 5% or more and 30% or less), the secondary batteries have a high ionic conductivity of about 4 mS/cm or more.

The results of Sample 7 show that, when the solid electrolyte contains the LPS glass powder but does not contain the argyrodite sulfide, the secondary battery has no structural defects but the solid electrolyte has a low effective ionic conductivity and a low charge/discharge efficiency. This is because of the absence of the argyrodite sulfide in the secondary battery according to Sample 7. It is noted that the argyrodite sulfide functions as an ion conduction path.

The results of Sample 1 show that, when the solid electrolyte contains the argyrodite sulfide but does not contain the LPS glass powder, the solid electrolyte has a low effective ionic conductivity and a low charge/discharge efficiency. This is because of the absence of the LPS glass powder in the secondary battery according to Sample 1.

The solid electrolyte according to the present disclosure may be used for a secondary battery. The secondary battery may be used for electronic devices and automobiles.

What is claimed is:

1. A solid electrolyte comprising:
   first particles including a first solid electrolyte material;
   second particles including a second solid electrolyte material; and
   a particle boundary layer including a third solid electrolyte material, and the particle boundary layer has a thickness smaller than a particle size of the first particles and a particle size of the second particles,
   wherein:
   the first solid electrolyte material has a higher ionic conductivity than the second solid electrolyte material, and
   the second solid electrolyte material has a lower Young's modulus than the first solid electrolyte material, and the third solid electrolyte material has a Young's modulus lower than or equal to the Young's modulus of the second solid electrolyte material.

2. The solid electrolyte according to claim 1,
   wherein the first solid electrolyte material contains at least one selected from the group consisting of a sulfide, an oxide, and a halide.

3. The solid electrolyte according to claim 2,
   wherein the first solid electrolyte material contains an argyrodite sulfide.

4. The solid electrolyte according to claim 3,
   wherein the argyrodite sulfide is represented by composition formula $Li_\alpha PS_\beta Cl_\gamma$,
   where $5.5 \leq \alpha \leq 6.5$, $4.55 \leq \beta \leq 5.5$, and $0.5 \leq \gamma \leq 1.5$.

5. The solid electrolyte according to claim 1,
   wherein the second solid electrolyte material contains at least one selected from the group consisting of a sulfide, an oxide, and a halide.

6. The solid electrolyte according to claim 5,
   wherein the second solid electrolyte material is selected from a sulfide, and
   the sulfide contains lithium sulfide and phosphorus sulfide.

7. The solid electrolyte according to claim 6,
   wherein the sulfide contains $Li_p S$-$P_q S_5$, and
   the following two formulas are satisfied:

$1.5 \leq p \leq 2.5$, and $1.5 \leq q \leq 2.5$.

8. The solid electrolyte according to claim 5,
   wherein the second solid electrolyte material contains a glass sulfide containing a triclinic crystal as a main component.

9. The solid electrolyte according to claim 1, wherein the third solid electrolyte material has a lower Young's modulus than the second solid electrolyte material.

10. The solid electrolyte according to claim 1, wherein the third solid electrolyte material has lower crystallinity than the second solid electrolyte material.

11. The solid electrolyte according to claim 1, wherein the third solid electrolyte material is amorphous.

12. The solid electrolyte according to claim 1, wherein the third solid electrolyte material belongs to the same material group as the second solid electrolyte material.

13. The solid electrolyte according to claim 1, wherein the particle boundary layer is present between the first particles and the second particles.

14. The solid electrolyte according to claim 13, wherein the particle boundary layer is present between adjacent two of the first particles, and the particle boundary layer is present between adjacent two of the second particles.

15. The solid electrolyte according to claim 1, wherein the following formula is satisfied:

$$0.05 \leq (vp2+vgb)/(vp1+vp2+vgb) \leq 0.7,$$

where vp1 represents a volume of the first particles, vp2 represents a volume of the second particles, and vgb represents a volume of the particle boundary layer.

16. The solid electrolyte according to claim 15, wherein the following formula is satisfied:

$$0.05 \leq (vp2+vgb)/(vp1+vp2+vgb) \leq 0.5.$$

17. The solid electrolyte according to claim 16, wherein the following formula is satisfied:

$$0.05 \leq (vp2+vgb)/(vp1+vp2+vgb) \leq 0.3.$$

18. The solid electrolyte according to claim 1, wherein the following formula is satisfied:

$$0.05 \leq (vgb)/(vp2+vgb) \leq 0.15,$$

where vp2 represents a volume of the second particles, and vgb represents a volume of the particle boundary layer.

19. A battery comprising:
a positive electrode;
a negative electrode; and
an electrolyte layer between the positive electrode and the negative electrode,
wherein at least one selected from the group consisting of the positive electrode, the negative electrode, and the electrolyte layer contains the solid electrolyte according to claim 1.

20. The battery according to claim 19, wherein the electrolyte layer contains the solid electrolyte.

21. The solid electrolyte according to claim 1, wherein the third solid electrolyte material is different from at least one of the first solid electrolyte material or the second solid electrolyte material.

* * * * *